US008958088B2

(12) United States Patent
Uchida

(10) Patent No.: US 8,958,088 B2
(45) Date of Patent: Feb. 17, 2015

(54) IMAGE FORMING APPARATUS AND IMAGE FORMING METHOD FOR DETECTING DISASTER INFORMATION AND PRINTING EVACUATION GUIDANCE INFORMATION

(71) Applicant: KYOCERA Document Solutions Inc., Osaka (JP)

(72) Inventor: Yuzuru Uchida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/227,329

(22) Filed: Mar. 27, 2014

(65) Prior Publication Data

US 2014/0293346 A1     Oct. 2, 2014

(30) Foreign Application Priority Data

Mar. 29, 2013    (JP) ................................. 2013-071853

(51) Int. Cl.
*G06F 3/12*             (2006.01)
*H04N 1/00*           (2006.01)

(52) U.S. Cl.
CPC ................................ *H04N 1/00498* (2013.01)
USPC ........................................ 358/1.13; 358/1.15

(58) Field of Classification Search
CPC .................................................. H04N 1/00498
USPC .............................................. 358/1.13, 1.15
See application file for complete search history.

(56) References Cited

U.S. PATENT DOCUMENTS

| | | | | |
|---|---|---|---|---|
| 6,518,878 | B1 * | 2/2003 | Skoff | 340/506 |
| 7,095,513 | B2 * | 8/2006 | Stringham | 358/1.13 |
| 7,185,289 | B1 * | 2/2007 | Taima | 715/810 |
| 8,719,705 | B2 * | 5/2014 | Horikoshi | 715/705 |
| 2005/0058485 | A1 * | 3/2005 | Horii et al. | 400/76 |
| 2005/0162679 | A1 * | 7/2005 | Iguchi | 358/1.13 |
| 2005/0264830 | A1 * | 12/2005 | Une et al. | 358/1.1 |
| 2006/0077428 | A1 * | 4/2006 | Lovat et al. | 358/1.15 |
| 2009/0276804 | A1 * | 11/2009 | Hamada et al. | 725/33 |

FOREIGN PATENT DOCUMENTS

JP      2010-034638 A     2/2010

\* cited by examiner

*Primary Examiner* — Benny Q Tieu
*Assistant Examiner* — Quyen V Ngo
(74) *Attorney, Agent, or Firm* — Knobbe, Martens, Olson & Bear LLP

(57) ABSTRACT

An image forming apparatus includes a language setting history storage section configured to store a history of language setting through which a language used is specified from among a plurality of languages; an evacuation guidance information storage section configured to store respective sets of evacuation guidance information described in a plurality of different languages; a disaster information acquiring section configured to acquire disaster information in the event of a disaster; a language selecting section configured to, when the disaster information is acquired, select one or more languages based on the history of language setting; an image forming section; and a processing section configured to allow the image forming section to print, out of the sets of evacuation guidance information, one or more sets of evacuation guidance information described in the one or more languages selected by the language selecting section.

9 Claims, 6 Drawing Sheets

Fig.4

| 日本語 | ENGLISH | ESPANOL |
|---|---|---|
| 避難場所：玉造市西大路XX X、YY中学校 | REFUGE PLACE: YY JUNIOR HIGH SCHOOL IN NISHIOOJI, TAMATSUKURI XXX | EL REFUGIO EL PUESTO: LA ESCUELA SECUNDARIA ELEMENTAL DE YY EN NISHIOOJI, TAMATSUKURI XXX |
| 玉造から、国道Z号線に沿って行く | IT GOES ALONG NATIONAL ROUTE Z FROM TAMATSUKURI. | SE VA A LO LARGO DE LA RUTA Z NACIONAL DE TAMATSUKURI. |
| .. | .. | .. |

92

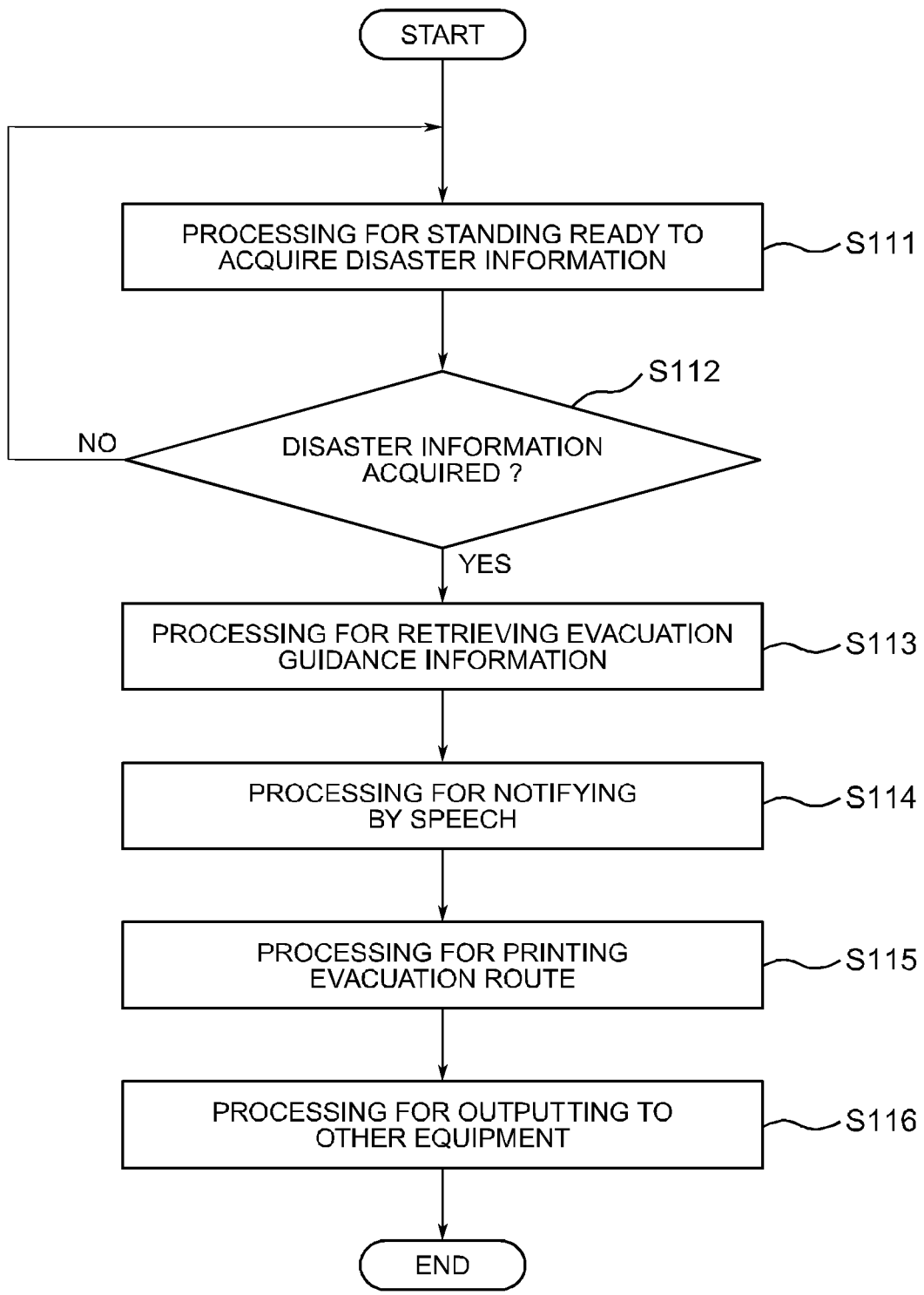

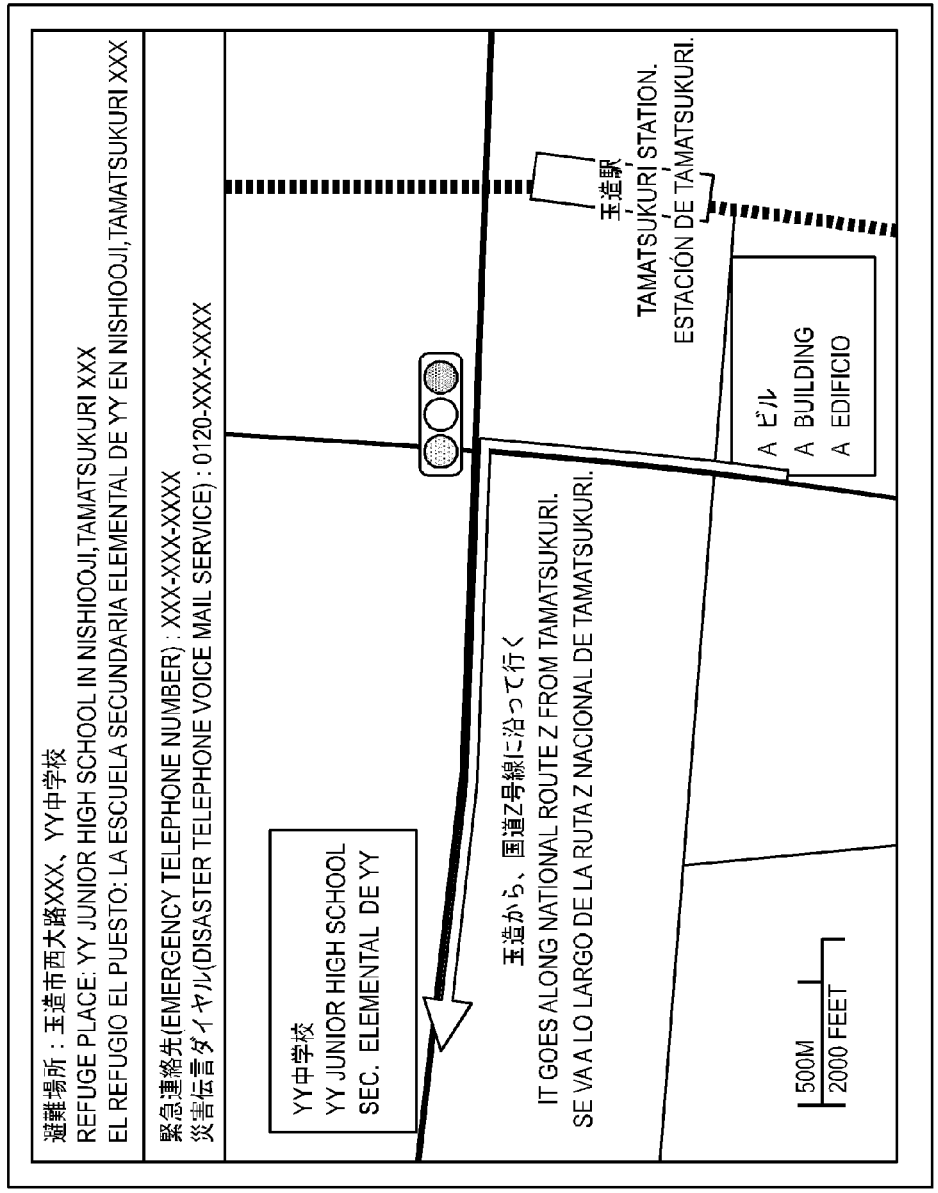

IMAGE FORMING APPARATUS AND IMAGE FORMING METHOD FOR DETECTING DISASTER INFORMATION AND PRINTING EVACUATION GUIDANCE INFORMATION

INCORPORATION BY REFERENCE

This application claims priority to Japanese Patent Application No. 2013-71853 filed on Mar. 29, 2013, the entire contents of which are incorporated by reference herein.

BACKGROUND

The present disclosure relates to image forming apparatuses and image forming methods and particularly relates to an image forming apparatus and an image forming method which are capable of notifying of disaster information.

There exist image forming apparatuses, such as a multifunction peripheral (MFP), capable of printing texts and images. Meanwhile, a printing device with a disaster information receiving function is known which can receive disaster information and automatically print out map information previously stored in a memory and having an evacuation route drawn on a map. With this technique of the printing device with a disaster information receiving function, map information can be automatically printed out just before or after the occurrence of a disaster, so that the user can know the evacuation route even if the printing device should become unusable owing to power outage sometime after the occurrence of the disaster.

However, the above technique, in the event of a disaster, does nothing other than printing out map information drawn in a language previously stored on the printing device. Therefore, users using other languages, such as foreign people, around the printing device cannot effectively be notified of the evacuation route. Specifically, even if the users using other languages look at the map drawn in the previously stored language, they may be unable to understand what happened and may panic or become anxious.

SUMMARY

A technique for effectively notifying of evacuation guidance information in the event of a disaster is proposed as one aspect of the present disclosure.

An image forming apparatus according to one aspect of the present disclosure includes a language setting history storage section, an evacuation guidance information storage section, a disaster information acquiring section, a language selecting section, an image forming section, and a processing section.

The language setting history storage section is configured to store a history of language setting through which a language used is specified from among a plurality of languages.

The evacuation guidance information storage section is configured to store respective sets of evacuation guidance information described in a plurality of different languages.

The disaster information acquiring section is configured to acquire disaster information in the event of a disaster.

The language selecting section is configured to, when the disaster information acquiring section acquires the disaster information, select one or more languages based on the history of language setting stored in the language setting history storage section.

The image forming section is configured to form an image on a recording medium.

The processing section is configured to allow the image forming section to print, out of the sets of evacuation guidance information stored in the evacuation guidance information storage section, one or more sets of evacuation guidance information described in the one or more languages selected by the language selecting section.

An image forming method according to another aspect of the present disclosure includes the steps of:

storing a history of language setting through which a language used is specified from among a plurality of languages;

storing respective sets of evacuation guidance information described in a plurality of different languages; acquiring disaster information in the event of a disaster;

upon acquirement of the disaster information, selecting one or more languages based on the history of language setting; and allowing an image forming section to print, out of the stored sets of evacuation guidance information, one or more sets of evacuation guidance information described in the selected one or more languages.

BRIEF DESCRIPTION OF THE DRAWINGS

FIG. 4 is a conceptual table of evacuation guidance text information in the embodiment of the present disclosure.

FIG. 5 is a flowchart of processing for notifying of evacuation guidance information in the embodiment of the present disclosure.

FIG. 6 shows an example of an evacuation route map in the embodiment of the present disclosure.

DETAILED DESCRIPTION

Hereinafter, a description will be given of an image forming apparatus and an image forming method according to an embodiment as one aspect of the present disclosure with reference to the drawings.

[Embodiment]

Structure of Image Forming Apparatus 1

Figure 1:
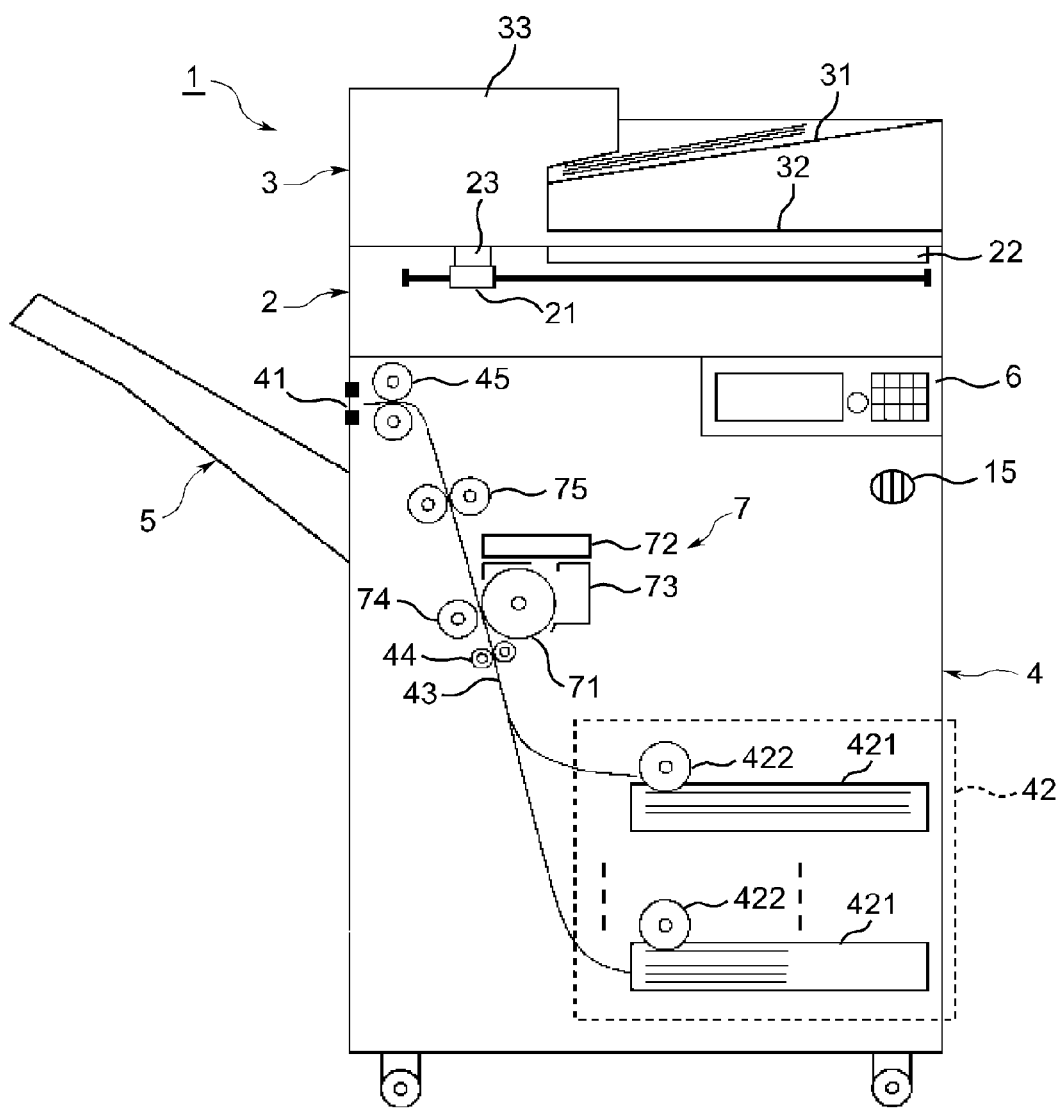
FIG. 1 is a schematic cross-sectional view showing an internal structure of an image forming apparatus according to an embodiment of the present disclosure.

A detailed description will be given of the structure of an image forming apparatus 1 according to one embodiment of the present disclosure with reference to FIG. 1. Referring to FIG. 1, the image forming apparatus 1 includes a document reading section 2, a document feed section 3, a main section 4, a stack tray 5 (sorting section), an operating panel section 6, and a voice notification section 15.

The document reading section 2 is disposed on the top of the main section 4. The document feed section 3 is disposed on the top of the document reading section 2. The stack tray 5 is disposed near an output port 41 which is formed in the main section 4 and through which recording paper sheets are discharged. The operating panel section 6 is disposed on the front side of the image forming apparatus 1.

The document reading section 2 includes a scanner 21, a platen glass 22, and a document read slit 23. The scanner 21 is composed of an exposure lamp, a CCD (charge coupled device) or CMOS (complementary metal oxide semiconductor) image sensor, and so on and configured to be movable in a direction of conveyance of an original document by the document feed section 3. The platen glass 22 is a document table made of transparent material, such as glass. The document read slit 23 is a slit formed in a direction perpendicular to the direction of conveyance of an original document by the document feed section 3.

In reading an original document placed on the platen glass 22, the scanner 21 is moved to a position facing the platen glass 22, acquires image data of the original document by reading the original document placed on the platen glass 22 while scanning it, and outputs the acquired image data to the main section 4.

On the other hand, in reading an original document conveyed by the document feed section 3, the scanner 21 is moved to a position facing the document read slit 23, acquires image data of the original document by reading the original document through the document read slit 23 in synchronism with the document conveying action of the document feed section 3, and outputs the acquired image data to the main section 4.

The document feed section 3 includes a document placement portion 31, a document discharge portion 32, and a document conveyance mechanism 33. Original documents placed on the document placement portion 31 are sequentially fed and conveyed to the position facing the document read slit 23 sheet by sheet by the document conveyance mechanism 33 and then discharged to the document discharge portion 32. The document feed section 3 is foldably formed so that the top surface of the platen glass 22 can be opened to the outside by lifting up the document feed section 3.

The document feed section 3 may be configured to read evacuation information in map and/or text form with a specified reading sheet or the like holding the map and/or text form.

The main section 4 includes an image forming section 7, a paper feed section 42, a paper conveyance path 43, a conveyance roller 44, and an output roller 45. The paper feed section 42 includes a plurality of paper feed cassettes 421 capable of containing different sets of recording paper sheets having different sizes or directions; and their respective paper feed rollers 422 operable to feed the recording paper sheets sheet by sheet to the paper conveyance path 43.

The paper feed rollers 422, the conveyance roller 44, and the output roller 45 function as a conveyance section. The recording paper sheet is conveyed by the conveyance section. The recording paper sheet fed to the paper conveyance path 43 by each paper feed roller 422 is conveyed to the image forming section 7 by the conveyance roller 44. Then, the recording paper sheet subjected to image formation by the image forming section 7 is discharged to the stack tray 5 by the output roller 45.

The stack tray 5 may include a sorting mechanism equipped with rollers and the like operable to stagger the discharged recording paper sheets into different positions. Instead of the stack tray 5, a sorter may be provided which can sort and discharge the recording paper sheets into multiple stages.

The operating panel section 6 includes: a display, such as an LCD or an organic EL display; a start key; a ten-key pad; buttons for selecting the operating mode, such as from among copy, facsimile transmission, and scan; and buttons and a touch panel for use in inputting commands to execute jobs regarding printing, sending, saving, recording or the like of selected data. In short, the operating panel section 6 is configured to acquire users' commands to execute various jobs in the image forming apparatus 1. Furthermore, information about account settings 90 for users can be entered and changed through the operating panel section 6.

The image forming section 7 includes a photosensitive drum 71, an exposure section 72, a developing section 73, a transfer section 74, and a fixing section 75.

The exposure section 72 is an optical unit including a laser device, an LED array, a mirror, and a lens and is configured to emit light or the like based on image data to expose the photosensitive drum 71 to the light and thus form an electrostatic latent image on the surface of the photosensitive drum 71.

The developing section 73 is a developing unit configured to develop the electrostatic latent image formed on the photosensitive drum 71 to form, on the photosensitive drum 71, a toner image based on the electrostatic latent image. The transfer section 74 is configured to transfer to a recording paper sheet the toner image formed on the photosensitive drum 71 by the developing section 73. The fixing section 75 is configured to apply heat to the recording paper sheet having the toner image transferred thereto by the transfer section 74 to fix the toner image on the recording paper sheet.

Figure 2:
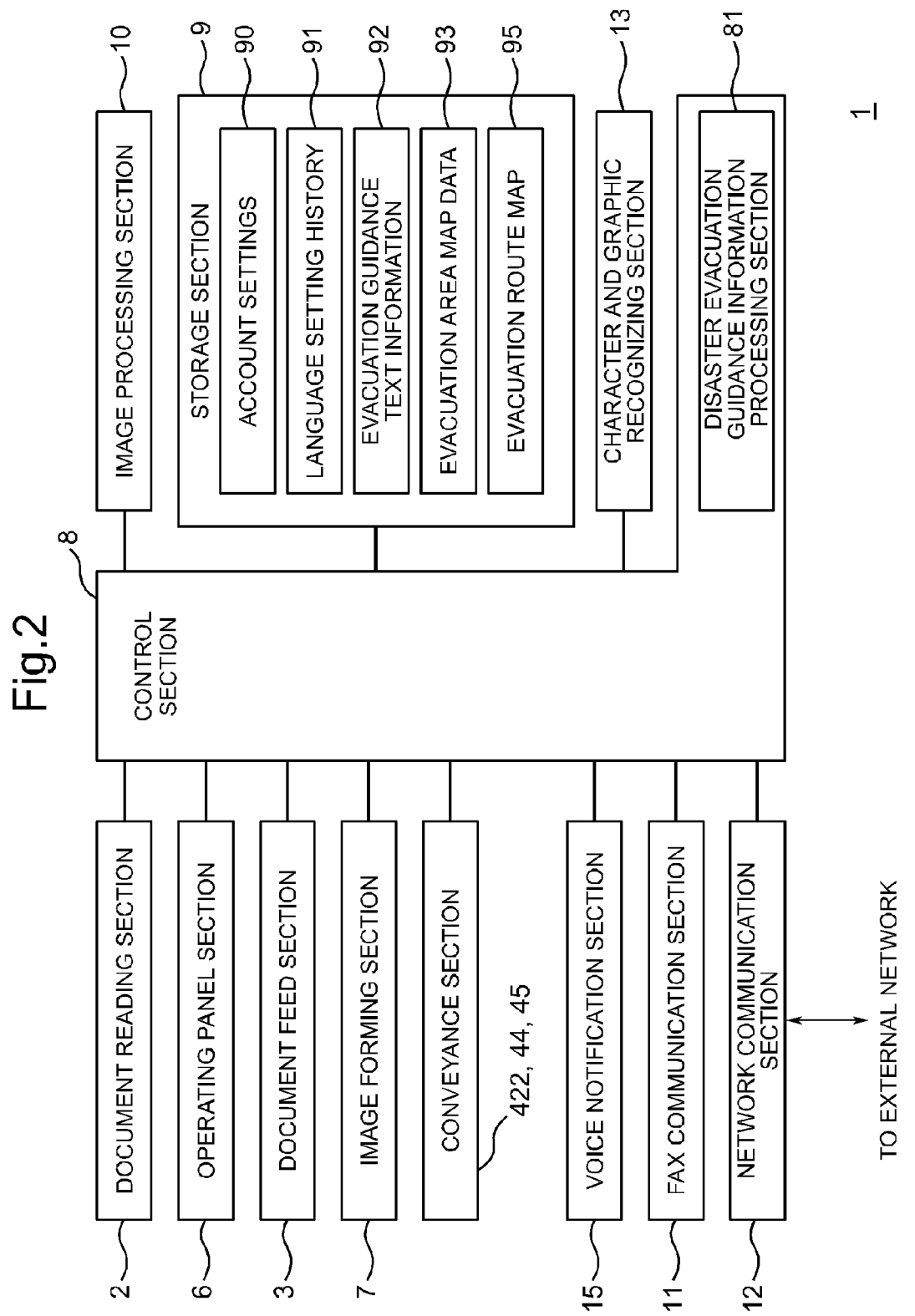
FIG. 2 is a block diagram showing a control architecture of the image forming apparatus according to the embodiment of the present disclosure.

FIG. 2 shows a block diagram of a schematic configuration of the image forming apparatus 1. The document reading section 2, the document feed section 3, the conveyance section (the paper feed roller 422, the conveyance roller 44, and the output roller 45), the operating panel section 6, and the image forming section 7 are connected to a control section 8 and the operations of them are controlled by the control section 8. Also connected to the control section 8 are a storage section 9, an image processing section 10, a fax communication section 11, a network communication section 12, a character and graphic recognizing section 13, a voice notification section 15, and so on.

The control section 8 is an information processing section, such as a microcomputer, equipped with a ROM (read only memory), a RAM (random access memory), and so on. The ROM stores a control program for executing the operation control of the image forming apparatus 1.

The control section 8 and the image processing section 10 are configured to take the overall control of the apparatus according to information of a command input through the operating panel section 6 by reading the control program stored in the ROM and developing it in the RAM.

The control section 8 further includes a disaster evacuation guidance information processing section 81 (a disaster information acquiring section, a language selecting section, an evacuation guidance information copy number adjustment section, an evacuation guidance information printing order adjustment section, and a processing section).

The disaster evacuation guidance information processing section 81 is configured to, based on a stored history of language setting, calculate the frequency of selection of each of languages for use in outputting evacuation guidance information in the event of a disaster, set priorities on the languages according to the frequency of selection of each language, and select one or more languages based on the priorities. When acquiring disaster information, the disaster evacuation guidance information processing section 81 allows the voice notification section 15 to notify of evacuation by voice in the selected languages. Furthermore, the disaster evacuation guidance information processing section 81 allows the image forming section 7 to output previously stored evacuation guidance information. In doing so, the disaster evacuation guidance information processing section 81 adjusts, based on the frequency of selection of each language, the number of copies printed of the evacuation guidance information for each language and the order of printing thereof among the languages.

The storage section 9 is a storage for which a storage medium, such as a semiconductor memory or an HDD (hard disk drive) is used. The storage section 9 stores the history of language setting, map and text information for evacuation guidance, image data scanned by the document reading section 2, image data processed by the image processing section 10, document data to be printed transmitted from users' terminals, various files read from recording media connected thereto, thumbnail-size image data, and so on. The storage section 9 may include a region for saved folders created on a user-by-user basis. Details of the data stored in the storage section 9 will be described later.

The image processing section 10 is an arithmetic control section, such as a DSP (digital signal processor) or a GPU (graphics processing unit). The image processing section 10 is a section configured to subject image data to specified image processing and perform various types of image processing, for example, enlargement/reduction processing and image improvement processing, such as density adjustment and gradation adjustment. The image processing section 10 converts image read by the document reading section 2 into a file format, such as PDF or TIFF, and allows the storage section 9 to store the file as scanned image data.

The fax communication section 11 is a section configured to send and receive a facsimile and is connected to an ordinary telephone line, an ISDN line, and so on. Furthermore, the fax communication section 11 may allow the storage section 9 to store received facsimile image. In addition, the fax communication section 11 can transmit image data stored in the storage section 9 as a facsimile instead of printing in the image forming section 7.

The network communication section 12 is a network connection section including a LAN board for connection to network and a connecting part to a wireless LAN, a PHS, and a cellular phone network.

The network communication section 12 can receive disaster information regarding the occurrence of a disaster, such as an emergency earthquake flash or an emergency bell.

The character and graphic recognizing section 13 is an arithmetic control section, such as an OCR (optical character reader) or a DSP for optical character recognition and graphic recognition. The character and graphic recognizing section 13 discriminates map from text in image data scanned by the document reading section 2 and, particularly, recognizes character information and graphic information on the map. The character and graphic recognizing section 13 can recognize characters multilingually and recognize symbols, two-dimensional bar codes, and the like on maps.

The voice notification section 15 includes an amplifier, a speaker, a buzzer, a speech synthesizer, a storage storing waveform data, and so on and is configured to notify of evacuation instruction in speech in the event of a disaster. Under the control of the disaster evacuation guidance information processing section 81, the voice notification section 15 can notify of evacuation instruction in multilingual speech produced from sets of text information in different languages.

In the image forming apparatus 1, the control section 8, the image processing section 10, and the character and graphic recognizing section 13 may be integrated together, as in a CPU with a built-in GPU or a chip-on-module package.

(Configuration of Storage Section 9)

A description will be given below of details of the data stored in the storage section 9. The storage section 9 stores account settings 90, a language setting history 91 (a history of language setting), evacuation guidance text information 92 (evacuation guidance information), evacuation area map data 93 (evacuation guidance information), and an evacuation route map 95 (evacuation guidance information). In other words, the storage section 9 functions as an account information storage section storing the account settings 90. The storage section 9 also functions as a language setting history storage section storing the language setting history 91. The storage section 9 also functions as an evacuation guidance information storage section storing the evacuation guidance text information 92, the evacuation area map data 93, and the evacuation route map 95.

The account settings 90 are various kinds of information stored for each user account, including a language setting, authorization information, a mail address, an address, a phone number, and a fax number. The storage section 9 stores, as the account settings 90 for each user, the various kinds of information on the user entered through the operating panel section 6, a user's terminal or the like by the user. The authorization information of the account settings 90 may contain information on an administrative user appointed a person responsive for evacuation guidance.

The language setting history 91 is information containing a history of language setting done by users through the operating panel section 6, unshown external terminals, and so on. The time history of language setting, such as the minute, hour, date, and year of change of language setting, may be contained in the language setting history 91. The language setting history 91 may further contain a history of setting of languages, including languages used in print data of users, languages acquired by OCR recognition of scanned image files, and languages indicated in the account settings 90 of login users.

The evacuation guidance text information 92 contains, for each language, text information in which phrases or sentences necessary for the route and guidance from the present location to the evacuation destination are described, for example, in table form. The evacuation guidance text information 92 contains a set of text information based on a default language setting for the image forming apparatus 1 and further contains respective sets of text information in other languages translated from the default language. The evacuation guidance text information 92 stored in the storage section 9 can be corrected, for example, by administrator's operation of the operating panel section 6.

Furthermore, the evacuation guidance text information 92 contains information on the location where the image forming apparatus 1 is installed (location of the image forming apparatus 1), address information, emergency phone numbers, a phone number for emergency messaging service after disaster, emergency contact numbers, and explanation of safety confirmation methods including the emergency messaging service. The evacuation guidance text information 92 further contains voice data for speech output of the above various kinds of information.

The evacuation area map data 93 is image data showing the evacuation route from the location of the image forming apparatus 1. Out of the sets of text information in various languages contained in the evacuation guidance text information 92, one or more sets of text information in the selected one or more languages are printed as evacuation guidance information on the evacuation area map data 93.

The evacuation area map data 93 may contain map data and building information on the neighboring area around the location of the image forming apparatus 1, which has been previously acquired such as by downloading from an unshown server. Respective sets of evacuation area map data 93 for different languages may be previously downloaded. The evacuation area map data 93 may contain image data read by the document reading section 2 or image data read from an external recording medium or terminal. The evacuation area map data 93 may contain metadata, such as information on the coordinate for writing text information and the date and time of creation.

The respective sets of text information in the evacuation guidance text information 92 indicated in a predetermined number of languages selected based on the language setting history 91 are written on the evacuation route map 95 in the order of the priorities set on these languages. The acquired disaster information may be written on the evacuation route map 95. A plurality of types of evacuation route maps 95 may be created. The evacuation route map 95 may be data in a file format, such as PDF.

[Processing for Selecting Languages for Evacuation Guidance by Image Forming Apparatus 1]

Figure 3:
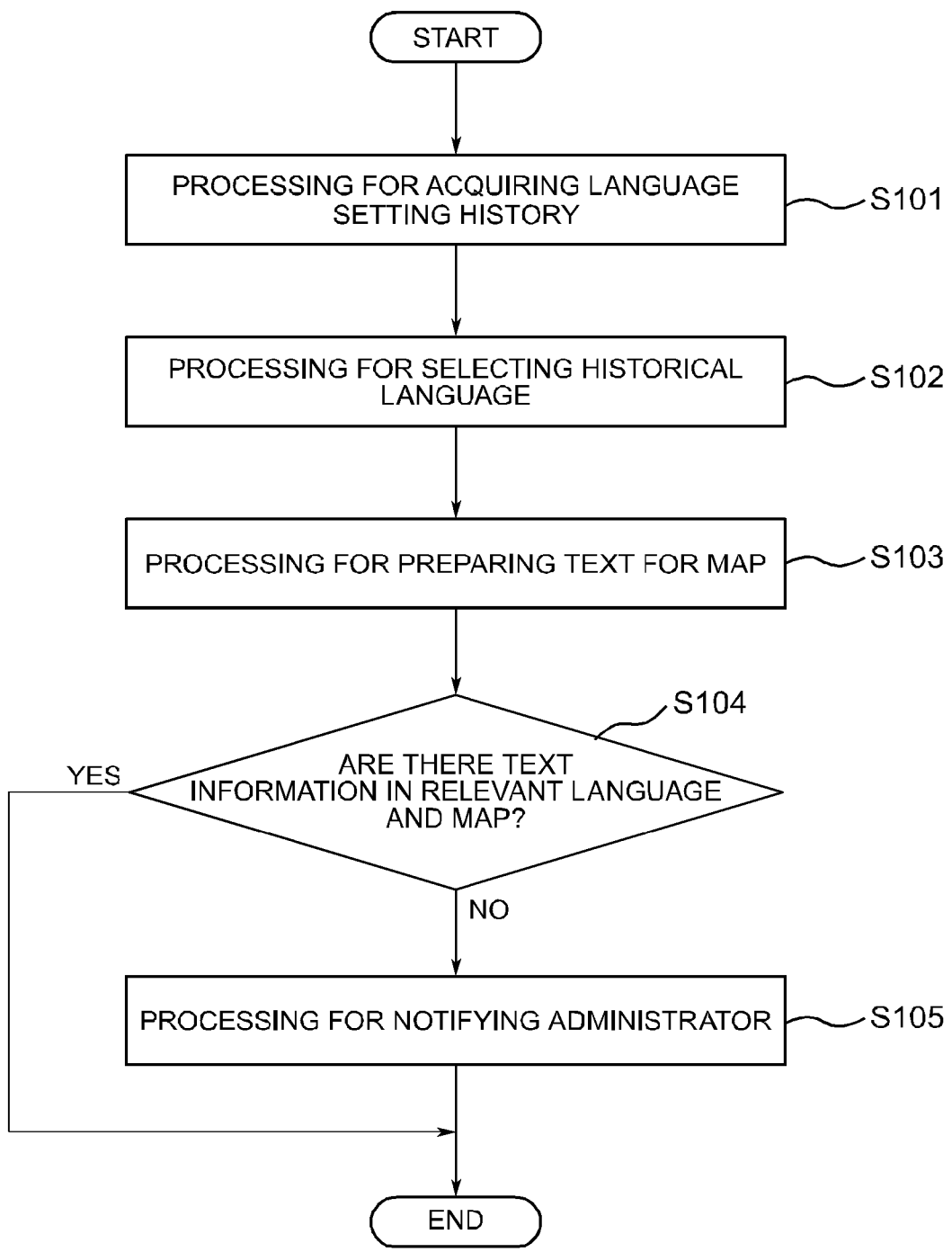
FIG. 3 is a flowchart of processing for selecting languages for evacuation guidance in the embodiment of the present disclosure.

With reference to FIGS. 3 and 4, a description will be given below of processing for selecting languages for evacuation guidance in the image forming apparatus 1 according to the embodiment of the present disclosure.

In the processing for selecting languages for evacuation guidance in this embodiment, evacuation guidance information in case of disaster is stored before the occurrence of a disaster. Furthermore, languages given priorities for outputting the evacuation guidance information are selected based on the history of language setting done mainly through the operating panel section 6.

This processing for selecting languages for evacuation guidance is processing in which using hardware resources, the control section 8 mainly executes, for example, a program in the storage section 9 in collaboration with various elements.

Hereinafter, details of the processing for selecting languages for evacuation guidance will be described step by step with reference to the flowchart of FIG. 3.

(Step S101)

First, the disaster evacuation guidance information processing section 81 executes processing for acquiring the language setting history.

When the setting of the language to be displayed on the operating panel section 6 is changed through the operating panel section 6, the disaster evacuation guidance information processing section 81 allows the storage section 9 to store the changed language setting to include it into the language setting history 91. In doing so, the disaster evacuation guidance information processing section 81 allows the language setting history 91 to also include the time at which the language setting has been changed.

Furthermore, the disaster evacuation guidance information processing section 81 associates the account settings 90 set for the login user with the set language and allows the storage section 9 to store the account settings 90 and the login time to include them into the language setting history 91.

Because successive storage of the language setting history 91 narrows the capacity of the storage section 9, old history data may be deleted after storage for a predetermined period of time, for example, a couple of years.

(Step S102)

Next, the disaster evacuation guidance information processing section 81 executes processing for selecting one or more historical languages.

The disaster evacuation guidance information processing section 81 refers to the language setting history 91 to select a predetermined number of recently set languages as languages for use in notifying of evacuation guidance information. The disaster evacuation guidance information processing section 81 calculates the priorities for languages for use in outputting according to the frequency of selection of each language or other criteria while giving the highest priority to the latest language used and selects one or more high-priority languages. For example, the disaster evacuation guidance information processing section 81 calculates the priorities for languages for use in outputting by weighting each language, based on the period during which the language has been set in the language setting, so that the language being set at the present moment is weighted maximally and earlier set languages are weighted more lightly. Specifically, the disaster evacuation guidance information processing section 81 weights each set language so that the language being set at the after-mentioned time of acquisition of disaster information is weighted maximally and earlier set languages are weighted more lightly by referring to the history within a predetermined period, for example, within one week before the time of acquirement of disaster information, sums up the weighted values for the same language, and sets priorities on the languages in descending order from that having the greatest total weighted value.

Furthermore, when selecting languages, the disaster evacuation guidance information processing section 81 can refer to the language setting from login users. Specifically, the disaster evacuation guidance information processing section 81 may, for each login user, set priorities on languages to give higher priorities to languages set more frequently within the predetermined period.

Moreover, the disaster evacuation guidance information processing section 81 may select different languages and calculate different priorities depending upon the time of day of acquirement of disaster information. Thus, the image forming apparatus 1 can cover, for example, the case where different groups of users use it depending upon day or night.

(Step S103)

Next, the disaster evacuation guidance information processing section 81 executes processing for preparing a text for a map.

As shown in FIG. 4, the disaster evacuation guidance information processing section 81 first prepares evacuation guidance text information 92 according to the one or more selected languages and the set priorities in S102 and allows the storage section 9 to store the evacuation guidance text information 92.

The disaster evacuation guidance information processing section 81 machine-translates a set of text information for evacuation guidance text information 92 prepared in the default language for the image forming apparatus 1 into the selected languages and includes the translated sets of evacuation guidance text information into the evacuation guidance text information 92. For example, if as shown in FIG. 4 Japanese, English, and Spanish are the selected languages and the default language is Japanese, the disaster evacuation guidance information processing section 81 accesses an unshown translation server through the network communication section 12 to acquire texts translated into English and Spanish, and includes the acquired texts into the evacuation guidance text information 92. The image forming apparatus 1 may incorporate a translation program.

Furthermore, the disaster evacuation guidance information processing section 81 allows a predetermined folder in the storage section 9 to store evacuation area map data 93 in the default language containing an evacuation area and an evacuation route. The disaster evacuation guidance information processing section 81 may acquire the evacuation area map data 93 together with the coordinate and map information by accessing a specific disaster-prevention server or the administrative user may have it ready beforehand and allow it to be read into external terminals and storage media.

(Step S104) Next, the disaster evacuation guidance information processing section 81 determines whether or not there are sets of text information in the selected one or more languages and the map. If the evacuation guidance text information 92 containing all of the sets of evacuation guidance text information in the selected languages and the evacuation area map data 93 have been acquired, the disaster evacuation guidance information processing section 81 determines "Yes". Otherwise, the disaster evacuation guidance information processing section 81 determines "No". If Yes in S104, the disaster evacuation guidance information processing section 81 ends the processing for selecting languages for evacuation guidance. If No in S104, the disaster evacuation guidance information processing section 81 allows the processing to proceed to step S105.

(Step S105)

In the absence of a set of text information in any of the selected languages or the map, the disaster evacuation guidance information processing section 81 executes processing for notifying the administrator.

If the disaster evacuation guidance information processing section 81 has not yet acquired the set of evacuation guidance text information in any of the selected languages or the evacuation area map data 93, it refers to the account settings 90 and notifies the administrative user of the absence of the set of text information or map, such as by e-mail.

The administrator having received the notification gives instructions through the operating panel section 6 or an external terminal to correct the evacuation guidance text information 92 and/or allow the storage section 9 to store the evacuation area map data 93.

In the manner thus far described, the processing for selecting languages for evacuation guidance in the one embodiment of the present disclosure ends.

The disaster evacuation guidance information processing section 81 may periodically notify the administrative user of the selected languages, the priorities, and the contents of the evacuation guidance text information 92 and the evacuation area map data 93.

Furthermore, the disaster evacuation guidance information processing section 81 can include language setting for print data transmitted from unshown external terminals into the language setting history 91. In addition, the disaster evacuation guidance information processing section 81 can allow the character and graphic recognizing section 13 to subject the original document read by the document reading section 2 to language analysis by OCR to recognize the language of the original document and allow the storage section 9 to store the language to include it into the language setting history 91. By doing so, the disaster evacuation guidance information processing section 81 can refer to the language setting for print data or the language recognized by OCR when selecting languages.

Processing for Notifying of Evacuation Guidance Information by Image Forming Apparatus 1

Next, with reference to FIGS. 5 and 6, a description will be given of details of the processing for notifying of the evacuation guidance information.

In the processing for notifying of the evacuation guidance information in this embodiment, if in the event of a disaster the image forming apparatus 1 is set to perform printing operation upon receipt of disaster information, it notifies the users of the disaster evacuation guidance information in speech and print in the languages selected based on the history of language setting. In doing so, maps indicating the evacuation area are printed out in the number of copies and order of printing changed according to the priorities for the selected languages.

This processing for notifying of the evacuation guidance information is also implemented so that using hardware resources, the control section 8 mainly executes, for example, a program in the storage section 9 in collaboration with various elements.

Hereinafter, details of the processing for notifying of the evacuation guidance information will be described step by step with reference to the flowchart of FIG. 5.

(Step S111)

First, the disaster evacuation guidance information processing section 81 executes processing for standing ready to acquire disaster information.

The disaster evacuation guidance information processing section 81 stands ready to acquire disaster information. The disaster evacuation guidance information processing section 81 acquires disaster information, such as by receiving, through the network communication section 12, an emergency earthquake flash or an alert signal from an emergency bell system in the building. Also when receiving a facsimile informing a disaster or the like through the fax communication section 11, the disaster evacuation guidance information processing section 81 acquires it as disaster information. The disaster evacuation guidance information processing section 81 may acquire disaster information by directly recognizing as disaster information a sound of an emergency bell input through an unshown sound input section.

(Step S112)

Next, the disaster evacuation guidance information processing section 81 determines whether or not disaster information has been acquired. When acquiring disaster information, the disaster evacuation guidance information processing section 81 determines that a disaster has occurred, i.e., determines "Yes". Otherwise, the disaster evacuation guidance information processing section 81 determines "No". If Yes in S112, the disaster evacuation guidance information processing section 81 allows the processing to proceed to step S113. If No in S112, the disaster evacuation guidance information processing section 81 returns the processing to step S111 and continues to stand ready.

(Step S113)

After acquiring disaster information, the disaster evacuation guidance information processing section 81 executes processing for retrieving evacuation guidance information.

The disaster evacuation guidance information processing section 81 retrieves, as the evacuation guidance text information 92, the sets of text information in the one or more languages selected in the processing for selecting one or more historical languages in step S102 (see FIG. 3). The disaster evacuation guidance information processing section 81 writes the evacuation guidance text information 92 into the evacuation area map data 93 to create an evacuation route map. The disaster evacuation guidance information processing section 81 may further write down the contents of the acquired disaster information on the evacuation route map 95.

For example, when as shown in FIG. 4 a plurality of languages are selected according to the priorities in the processing for selecting one or more historical languages in step S102 (FIG. 3), the disaster evacuation guidance information processing section 81 retrieves, as the evacuation guidance text information 92, respective sets of text information described in the plurality of languages. If in this case the languages have different frequencies of selection depending upon the time of day, the disaster evacuation guidance information processing section 81 may in S102 set higher priorities on languages having higher frequencies of selection at the present moment and in S113 retrieve sets of text information for the evacuation guidance text information 92 according to these priorities.

In doing so, the disaster evacuation guidance information processing section 81 integrates the sets of text information for the evacuation guidance text information 92 in the predetermined number of languages into the evacuation area map data 93 to put the sets of text information next to each other in the order of the above priorities, resulting in creation of an evacuation route map 95. FIG. 6 shows an example of the evacuation route map 95 on which the respective sets of text information in three languages are written down. In this example, Japanese, English, and Spanish are put next to each other. The disaster evacuation guidance information processing section 81 may further write down the acquired disaster information on the evacuation route map 95. As for maps in low-priority languages, the disaster evacuation guidance information processing section 81 may create images as separate maps from the evacuation route map 95 in which the sets of text information in the predetermined number of languages are put next to each other.

Alternatively, the disaster evacuation guidance information processing section 81 may create, for each selected language, an evacuation route map 95 described in a single language.

(Step S114)

Next, the disaster evacuation guidance information processing section 81 executes processing for notifying by speech.

The disaster evacuation guidance information processing section 81 transmits the set of text information for the evacuation guidance text information 92 adopted in S103 to the voice notification section 15 and allows the voice notification section 15 to notify of the evacuation route and the disaster information by speech.

In doing so, if a plurality of languages have been selected in S102, the disaster evacuation guidance information processing section 81 allows speech notification in the highest language in the priorities, i.e., the highest-priority language.

Alternatively, the disaster evacuation guidance information processing section 81 may allow speech notification in a plurality of languages selected in the processing for selecting one or more historical languages in descending order from the highest-priority language according to the priorities.

The disaster evacuation guidance information processing section 81 may output only a buzzer for an emergency earthquake prompt announcement prior to the speech guidance in the selected one or more languages.

(Step S115)

Next, the disaster evacuation guidance information processing section 81 executes processing for printing the evacuation route.

The disaster evacuation guidance information processing section 81 sets the number of copies printed for each language and the order of printing among the languages and allows the image forming section 7 to print out the evacuation route maps 95 created in S113 from the evacuation guidance text information 92 and the evacuation area map data 93.

In doing so, if the evacuation guidance text information 92 is composed of respective sets of text information in a plurality of languages, the disaster evacuation guidance information processing section 81 adjusts the number of copies for each language used in the evacuation route maps 95 to be printed and the order of printing among the languages.

The disaster evacuation guidance information processing section 81 adjusts the number of copies printed in each of the relevant languages based on the frequency of selection of each language in the language setting history 91. For example, the disaster evacuation guidance information processing section 81 makes adjustments to print out the evacuation route in a language of high frequency of selection in large numbers and print out the evacuation route in a language of low frequency of selection in small numbers.

Furthermore, the disaster evacuation guidance information processing section 81 adjusts the order of printing among the selected languages based on the frequency of selection of each language. For example, since copies in the language of high frequency of selection need to be printed in large numbers, the disaster evacuation guidance information processing section 81 makes adjustments to start printing with copies in the language of low frequency of selection.

The evacuation route map 95 containing the language of high priority and the evacuation route map 95 containing sets of text information in plural languages put next to each other are printed out by a predetermined number of copies to enable distribution to a large number of users.

Furthermore, the disaster evacuation guidance information processing section 81 makes such an adjustment that when the above printed matters are output, they are placed in different locations for different languages by the sorting mechanism of the stack tray 5. In the case where the image forming apparatus 1 is equipped with a sorter (a sorting section), the disaster evacuation guidance information processing section 81 allows the sorter to sort the sets of evacuation route maps 95 in different languages into different stages.

Thus, the evacuation guidance information indicating the evacuation route can be certainly recognized by various users speaking different languages.

In the case where the image forming apparatus 1 is equipped with neither sorting mechanism nor sorter, the disaster evacuation guidance information processing section 81 may first print out a cover page indicating the number of copies of evacuation route map 95 in each language and the order of printing among different evacuation route maps 95 in different languages. This cover page may contain descriptions in a plurality of languages.

(Step S116)

Next, the disaster evacuation guidance information processing section 81 executes processing for outputting to other equipment.

In the case where the user having selected a language can be assumed to be not around the image forming apparatus 1 but at another location, for example, because he/she has logged out, the disaster evacuation guidance information processing section 81 transmits the evacuation route map 95 through the network communication section 12 to his/her mail address indicated in the account settings 90 to allow the user to get the evacuation route map 95 at the location where he/her is. In doing so, the disaster evacuation guidance information processing section 81 can transmit the evacuation route map 95 in a file format, such as PDF, via e-mail or transmit it in a facsimile through the fax communication section 11. Thus, the user can certainly receive the evacuation route map 95.

Furthermore, the disaster evacuation guidance information processing section 81 can transmit and output the evacuation route map 95 through the fax communication section 11 or the network communication section 12 to other pieces of equipment, such as image forming apparatuses 1 and facsimile devices, preset to output the evacuation route map 95 in the event of a disaster. The disaster evacuation guidance information processing section 81 can set multiple pieces of equipment as those for outputting the evacuation route map 95 and allow the storage section 9 to store the setting.

A user may be at a location where an image forming apparatus 1 having a language setting history 91 not containing the user's language setting is located. Therefore, when such an image forming apparatus 1 having the language setting less frequently done is in the network, the disaster evacuation guidance information processing section 81 can automatically set the image forming apparatus 1 as a piece of equipment for outputting the evacuation route map 95.

In the manner thus far described, the processing for notifying of the evacuation guidance information in the one embodiment of the present disclosure ends.

With the above configuration, the following effects can be achieved.

The image forming apparatus 1 of the present disclosure can display the operation in a language selected from among different languages by language setting. The storage section 9 stores the language setting history 91 and stores the evacuation guidance text information 92, which is formed of respective sets of disaster evacuation guidance text information in different languages, the evacuation area map data 93, and the evacuation route map 95. The disaster evacuation guidance information processing section 81 acquires disaster information in the event of a disaster and, upon receipt of the disaster information, selects one or more languages based on the language setting history 91 stored in the storage section 9. The image forming section 7 outputs the evacuation route map 95 stored in the storage section 9 based on the selected one or more languages.

Since in this manner necessary languages can be known using the history of language setting done in the image forming apparatus 1 and the disaster information, the evacuation route, and the evacuation area are printed out in the necessary languages, even foreign users visited by a disaster can be certainly notified of the evacuation guidance information and guided to the evacuation area. Furthermore, victims can readily know the evacuation area after receiving an emergency earthquake flash. In addition, maps more accessible to victims can be printed, resulting in improved convenience.

In the image forming apparatus 1 according to the above embodiment of the present disclosure, the disaster evacuation guidance information processing section 81 retrieves the language setting history 91 stored in the storage section 9 and, based on the frequency of selection of each language, changes the number of copies of the evacuation route map 95 to be output for each language and the order of printing thereof among the languages.

Thus, larger numbers of copies of evacuation route map 95 are printed for languages used by larger numbers of users. Therefore, various types of evacuation route maps 95 understandable by various users can be certainly distributed to a large number of users. Hence, around the location where the image forming apparatus 1 is installed, even foreign users out of native language environments can be easily guided to the evacuation area.

Furthermore, since the language setting history is used, documents are output in languages certainly understandable by victims, so that they can acquire the evacuation information without anxiety.

Since the documents are sorted by language by the sorting section, even a small number of copies printed understandable only by a small part of victims can be certainly obtained by these victims.

Since the image forming apparatus 1 can print out the route from the present location to the evacuation destination, the emergency contact numbers, the safety confirmation methods including the emergency messaging service, and so on, the convenience for users can be further improved.

Since as described previously notification can be done by speech announcement in various languages, partially-sighted victims can also obtain the disaster information in their own languages.

The image forming apparatus of the present disclosure can transmit the evacuation route map 95 to terminals, such as PCs or smartphones and receive various settings through these terminals.

The contents of the present disclosure can be applied to information processing apparatuses other than image forming apparatuses.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
   a language setting history storage section configured to store a history of language setting through which a language used is specified from among a plurality of languages;
   an evacuation guidance information storage section configured to store respective sets of evacuation guidance information described in a plurality of different languages;
   a disaster information acquiring section configured to acquire disaster information in the event of a disaster;
   a language selecting section configured to, when the disaster information acquiring section acquires the disaster information, select one or more languages based on the history of language setting stored in the language setting history storage section;
   an image forming section configured to form an image on a recording medium; and
   a processing section configured to allow the image forming section to print, out of the sets of evacuation guidance information stored in the evacuation guidance information storage section, one or more sets of evacuation guidance information described in the one or more languages selected by the language selecting section.

2. The image forming apparatus according to claim 1, further comprising an evacuation guidance information copy number adjustment section configured to change, for each of the plurality of different languages, the number of copies of the set of evacuation guidance information to be printed by the image forming section based on a frequency of selection of the language indicated in the history of language setting stored in the language setting history storage section.

3. The image forming apparatus according to claim 1, further comprising an evacuation guidance information printing order adjustment section configured to change an order of printing among the respective sets of evacuation guidance information for the plurality of different languages to be printed by the image forming section based on a frequency of selection of each language indicated in the history of language setting stored in the language setting history storage section.

4. The image forming apparatus according to claim 1, further comprising a sorting section configured to sort printouts of the evacuation guidance information into different locations for each of the plurality of different languages.

5. The image forming apparatus according to claim 1, wherein
   the language selecting section selects a plurality of languages based on predetermined priorities, and the processing section creates an image in which the sets of evacuation guidance information in the plurality of languages selected by the language selecting section are arranged according to the priorities.

6. The image forming apparatus according to claim 1, wherein when the language selecting section selects a plurality of languages, the processing section allows the image forming section to print the set of evacuation guidance information for a language of low priority separately from the sets of evacuation guidance information for the other languages.

7. The image forming apparatus according to claim 1, wherein when the language selecting section selects a plurality of languages, the processing section allows the image forming section to print the set of evacuation guidance information for each of the languages.

8. The image forming apparatus according to claim 1, wherein the disaster information acquiring section acquires as the disaster information a sound of an emergency bell input through a sound input section.

9. An image forming method comprising the steps of:
    storing a history of language setting through which a language used is specified from among a plurality of languages;
    storing respective sets of evacuation guidance information described in a plurality of different languages;
    acquiring disaster information in the event of a disaster;
    upon acquirement of the disaster information, selecting one or more languages based on the history of language setting; and
    allowing an image forming section to print, out of the stored sets of evacuation guidance information, one or more sets of evacuation guidance information described in the selected one or more languages.

* * * * *